US009152966B2

(12) United States Patent
Gore et al.

(10) Patent No.: US 9,152,966 B2
(45) Date of Patent: Oct. 6, 2015

(54) DATA REPORTING FRAMEWORK ACROSS ON-PREMISE AND HOSTED CRM SERVICES

(75) Inventors: Abhijit Gore, Hyderabad (IN); Abhishek Agarwal, Hyderabad (IN); Kunal Garg, Hyderabad (IN); Ramani Jagadeba, Hyderabad (IN); Ankit Malpani, Hyderabad (IN); Adithya Vishwanath, Hyderabad (IN); Kulothungan Rajasekaran, Hyderabad (IN); Manjeet Bothra, Hyderabad (IN); Andrew Miller, Issaquah, WA (US); David Shutt, Redmond, WA (US); Edward Martinez, Copenhagen (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 342 days.

(21) Appl. No.: 13/099,750

(22) Filed: May 3, 2011

(65) Prior Publication Data

US 2012/0284312 A1 Nov. 8, 2012

(51) Int. Cl.
*G06F 17/30* (2006.01)
*G06Q 30/00* (2012.01)
*G06Q 10/10* (2012.01)

(52) U.S. Cl.
CPC .............. *G06Q 30/01* (2013.01); *G06Q 10/101* (2013.01)

(58) Field of Classification Search
CPC ................................................. G06F 17/30294
USPC ........................................................ 707/810
See application file for complete search history.

(56) References Cited

U.S. PATENT DOCUMENTS

| 6,578,068 | B1 * | 6/2003 | Bowman-Amuah | 709/203 |
|---|---|---|---|---|
| 7,343,625 | B1 * | 3/2008 | Zaidi et al. | 726/25 |
| 2002/0124070 | A1 * | 9/2002 | Pulsipher | 709/223 |
| 2003/0229522 | A1 * | 12/2003 | Thompson et al. | 705/4 |
| 2005/0065925 | A1 | 3/2005 | Weissman et al. | |
| 2005/0234908 | A1 * | 10/2005 | Lowrance et al. | 707/8 |
| 2007/0061487 | A1 * | 3/2007 | Moore et al. | 709/246 |
| 2007/0100845 | A1 | 5/2007 | Sattler et al. | |
| 2007/0283287 | A1 * | 12/2007 | Taylor et al. | 715/769 |
| 2008/0082572 | A1 * | 4/2008 | Ballard et al. | 707/102 |
| 2008/0086495 | A1 * | 4/2008 | Kiziltunc et al. | 707/102 |
| 2008/0183687 | A1 * | 7/2008 | Law | 707/4 |
| 2008/0201767 | A1 * | 8/2008 | Williams et al. | 726/6 |

(Continued)

OTHER PUBLICATIONS

"Getting Started with Custom Reports in the Cloud", Retrieved at <<http://blogs.msdn.com/b/crm/archive/2010/10/19/getting-started-with-custom-reports-in-the-cloud.aspx>>, Oct. 19, 2010, pp. 13.

(Continued)

*Primary Examiner* — Noosha Arjomandi
(74) *Attorney, Agent, or Firm* — Damon Rieth; Jim Ross; Micky Minhas

(57) ABSTRACT

A data reporting framework that works across on-premise and hosted Customer Relationship Management (CRM) platforms enabling definition and execution of secure custom reports is provided. A fetch query language of a CRM platform is used along with reporting service tools and constructs to enable users to upload and execute custom fetch based reports with support for expressions, code, formatting, and drill through. Users are also enabled to build simple reports from within CRM and, if needed, enhance those reports using reporting service tools and re-upload in CRM. Furthermore, custom reports may be executed in a sandboxed environment to provide full security in a multi-tenant, hosted CRM system.

17 Claims, 7 Drawing Sheets

(56) References Cited

U.S. PATENT DOCUMENTS

| | | | |
|---|---|---|---|
| 2011/0214064 A1* | 9/2011 | Schneider et al. | 715/741 |
| 2011/0307510 A1* | 12/2011 | Lopitaux et al. | 707/769 |
| 2011/0321175 A1* | 12/2011 | Slater | 726/28 |
| 2012/0041921 A1* | 2/2012 | Canaday et al. | 707/607 |
| 2012/0054222 A1* | 3/2012 | Soby | 707/769 |
| 2012/0089610 A1* | 4/2012 | Agrawal et al. | 707/741 |
| 2012/0144313 A1* | 6/2012 | Park et al. | 715/747 |
| 2012/0166458 A1* | 6/2012 | Laudanski et al. | 707/755 |
| 2012/0254221 A1* | 10/2012 | Lai et al. | 707/769 |

OTHER PUBLICATIONS

Redmond, Wash, "Microsoft Releases Next Generation CRM Solution for On-Premise and On-Demand Deployments", Retrieved at <<http://www.microsoft.com/Presspass/press/2007/dec07/12-17CRM40PR.mspx>>, Dec. 17, 2007, pp. 2.

"Microsoft Dynamics Crm Custom Report Development", Retrieved at <<http://www.milesconsultingcorp.com/Microsoft-Dynamics-CRM-Custom-Report-Development-Consultants.aspx>>, Retrieve Date: Feb. 8, 2011, pp. 3.

* cited by examiner

DATA REPORTING FRAMEWORK ACROSS ON-PREMISE AND HOSTED CRM SERVICES

BACKGROUND

Customer Relationship Management (CRM) is a set of strategies and programs for managing an organization's interactions with customers, clients, sales prospects, and similar entities. It involves using technology to organize, automate, and synchronize business processes such as sales activities, marketing activities, customer service, technical support, and comparable ones. With an overall goal of finding, attracting, and winning new clients, nurturing and retaining existing clients, enticing former clients back, and reducing costs of marketing and client service, CRM describes an organization-wide business strategy including customer-interface departments as well as other departments. Increases in revenue, higher rates of client satisfaction, and savings in operating costs are some of the benefits measurable of CRM to an enterprise.

For efficiency and satisfactory user experience, hosted, multi-tenant CRM systems need to provide their users a rich support for data reporting. Often these reporting solutions may be restrictive in nature when compared to their on-premise, single-tenant CRM system counterparts due to security and other reasons. Defining a rich and powerful framework for data reporting that works seamlessly between on-premise and hosted systems based on standard reporting tools remains a challenge.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a data reporting framework that works across on-premise and hosted CRM platforms enabling definition and execution of secure custom reports. According to some embodiments, a fetch query language of a CRM platform may be employed along with reporting service tools and constructs. A framework according to embodiments enables users to upload and execute custom fetch based reports with support for expressions, code, formatting, and drill through, as well as to build simple reports from within CRM and, if needed, enhance those reports using reporting service tools and re-upload in CRM. Furthermore, custom reports may be executed in a sandboxed environment to provide full security in a multi-tenant, hosted CRM system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
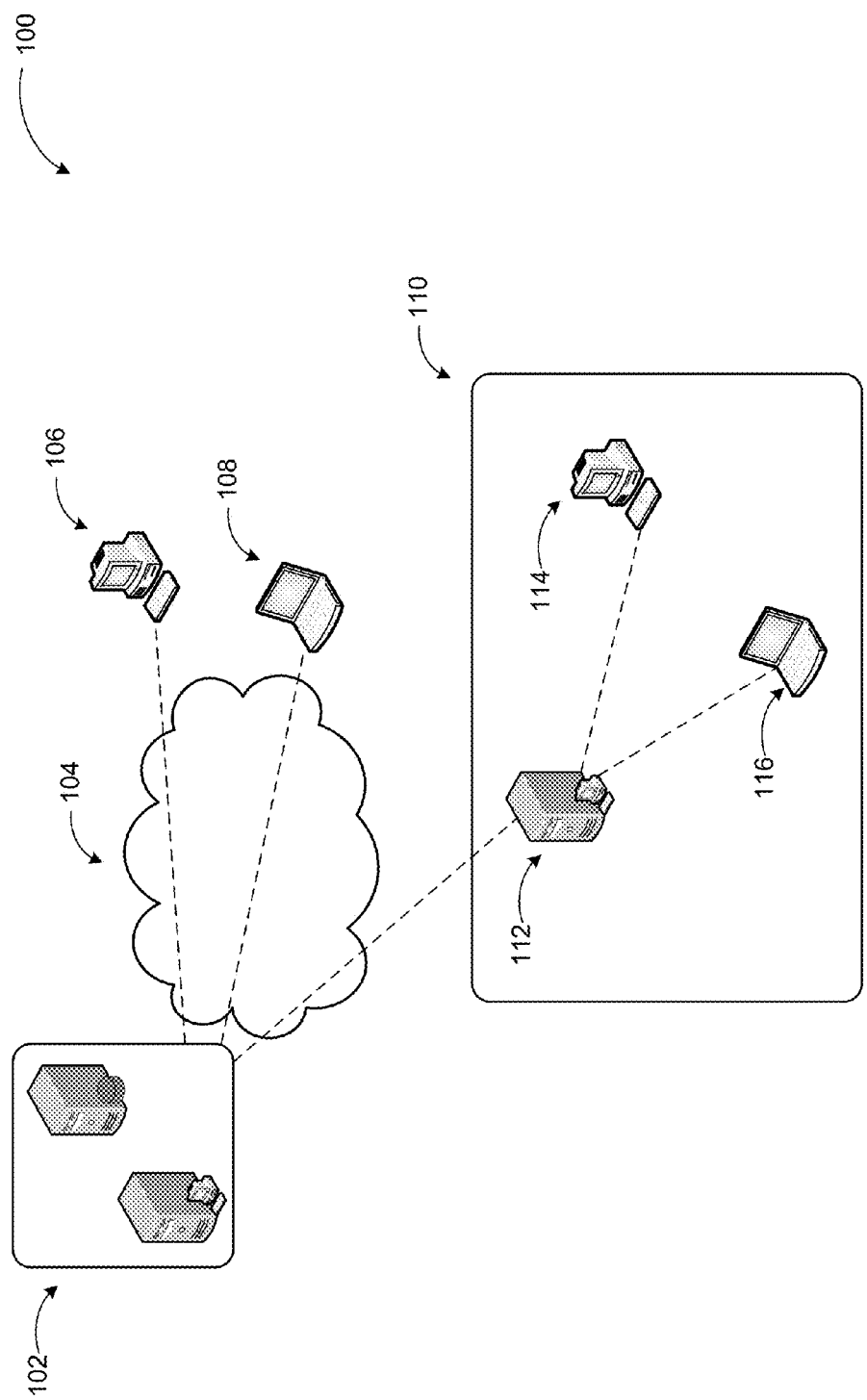
FIG. 1 is a conceptual diagram of a hosted and an on-premise CRM system.

As briefly described above, a fetch query language of a CRM platform may be employed for a data reporting framework that works across on-premise and hosted CRM platforms enabling definition and execution of secure custom reports. Users may be enabled to upload and execute custom fetch based reports with support for expressions, code, formatting, and drill through. Custom reports may be executed in a sandboxed environment to provide full security in a multi-tenant, hosted CRM system.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for enabling data reporting in a CRM system. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Referring to FIG. 1, a conceptual diagram of a hosted and an on-premise CRM system is illustrated on diagram 100. The components shown in FIG. 1 are for illustration purposes. Embodiments may be implemented employing additional components.

A Customer Relationship Management (CRM) platform is a multi-faceted combination of software and hardware providing services associated with sales, marketing, service, and other business aspects of customer relations. The services provided by a CRM platform may include, but are not limited to, data input, analysis, reporting, tracking of business metrics, contact management, and similar ones.

A CRM platform may be implemented as a single or multi-tenant hosted service (e.g., cloud-based services) where a number of business organizations are tenants of a single service provider. CRM operations associated with each tenant may be performed separately and securely by the service provider and accessed by authorized users of each tenant. This configuration is shown conceptually in diagram 100 as the CRM service 102 (executed on one or more servers) and clients 106, 108 communicating over network 104.

Another configuration of a CRM platform is the on-premise platform, where the CRM service is executed on secure servers of a single organization and users have access to the system via the organization's internal network(s) (or secure external links). An example on-premise CRM service 110 may include one or more servers 112 communicating with clients 114 and 116 within an enterprise network system.

In addition to the variety of services provided by a CRM platform, a number of access, security, and customization features may be implemented. Users may be enabled to access through a variety of rich or thin client applications (e.g., dedicated client applications, add-in modules, browsers, etc.) and devices (desktop computers, portable computers, terminals, etc.). Furthermore, the CRM platform—whether it is hosted or on-premise—may interact with other platforms integrating other services such as enterprise resource planning (ERP), accounting, and comparable ones.

As mentioned previously, hosted, multi-tenant CRM systems may be restrictive in data reporting when compared to their on-premise, single-tenant CRM system counterparts due to security and other reasons. Taking advantage of database reporting service tools and fetch query language, a system according to embodiments may enable users to upload and execute custom fetch based reports with support for expressions, code, formatting, and drill through. Simple reports may be built from within CRM, enhanced using reporting service tools, and re-uploaded in CRM.

Figure 2:
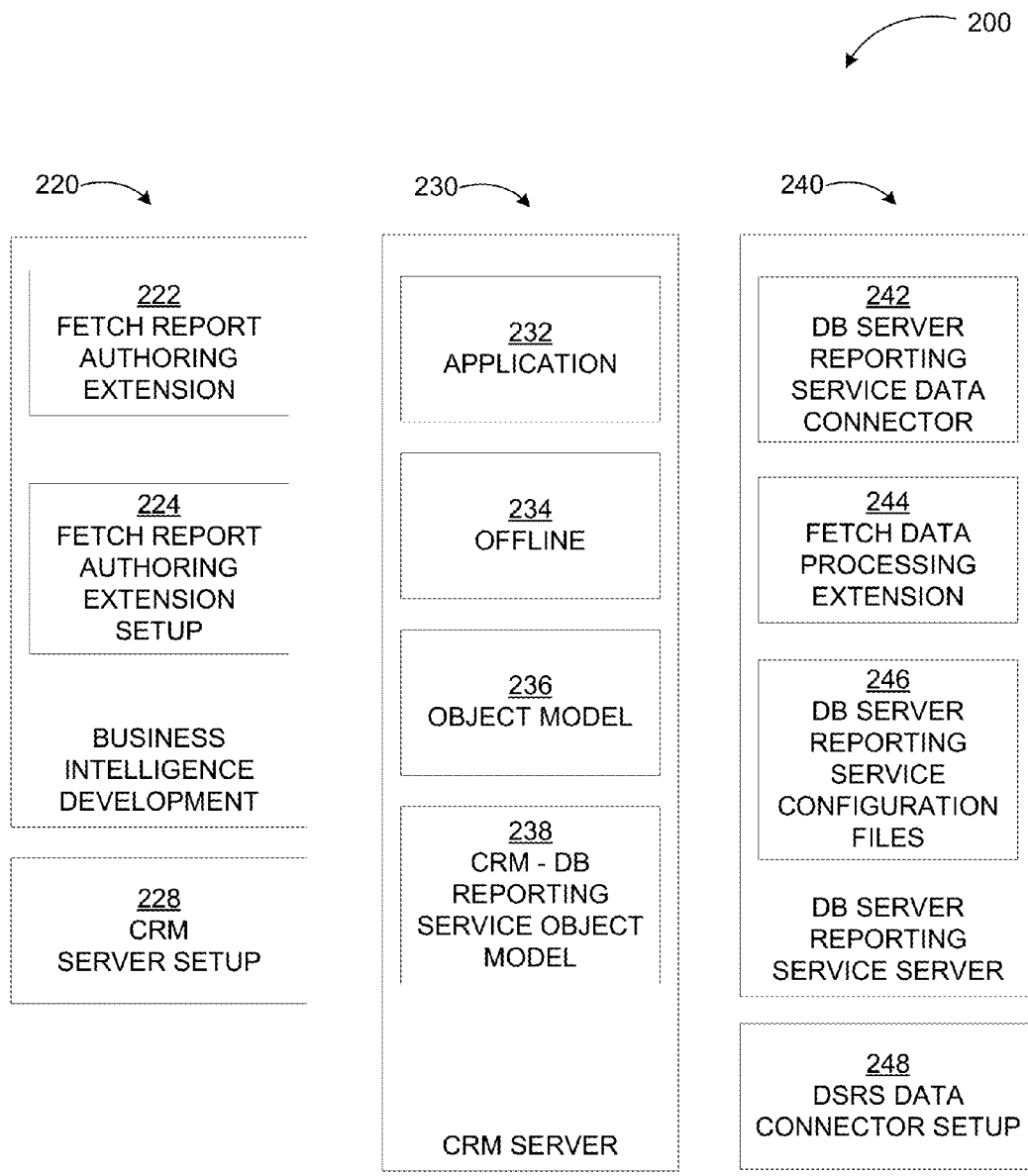
FIG. 2 illustrates major components of a CRM system according to some embodiments.

FIG. 2 illustrates major components of a CRM system according to some embodiments.

CRM server 230 is at the heart of the CRM platform executing one or more CRM applications 232 and performing offline operations 234, where object model 236 defines a collection of objects or classes through which the CRM application(s) 232 can examine and manipulate specific parts of the CRM platform. CRM-Database Reporting Service object model 238 may define objects specific to the data reporting framework according to embodiments.

A database server reporting service may be used to prepare and deliver a variety of interactive and printed reports. Such a service may be administered via a web interface. Reporting services may include a web services interface to support the development of custom reporting applications. Structured Query Language (SQL) databases are one of the most commonly used data bases. Thus, an example of database reporting services is SQL Server Reporting Services (SSRS)® by Microsoft Corp. of Redmond, Wash. SSRS is a server-based report generation system that enables users to create, deploy, and manage reports for their organization, as well as provides programming features that enable users to extend and customize their reporting functionality. Thus, database server reporting service (DBSRS) server 240 (or in a practical implementation SSRS) may manage components associated with the reporting service such as DBSRS data connector 242, fetch data processing extension 244, and/or DBSRS configuration files 246.

DBSRS may be executed on the same server as the CRM service or on a different server. DBSRS data connector 242 is a data processing extension which attaches itself to the DBSRS server and accepts the authentication information from the CRM server and passes it to the DBSRS server. In a system according to embodiments, DBSRS is extended with fetch data processing extension 244 to support reports based on CRM's data querying language. The extended DBSRS is enabled to query data using CRM's fetch queries thereby making custom data reporting more secure and possible on a hosted, multi-tenant system.

Thus, fetch may be used as the data querying language and fetch statements translated into database query language statements (e.g., SQL) behind the scenes. DBSRS servers may be assigned a separate role and locked down completely with least privilege configuration. Direct access of DBSRS server may be prevented from the Internet and report viewing requests proxied through CRM. Furthermore, internal, private web service endpoints may be utilized for allowing DBSRS to communicate with CRM web servers in order to fetch the data. According to some embodiments, load balancing may be performed among the available web servers to effectively manage report viewing requests. Moreover, DBSRS and sandboxing (separating executed programs) may be used to tightly control the usage of code elements and expressions.

Business intelligence development tool 220 provides authoring and preview services. Fetch report authoring extension 222 may be used to connect to the public web service endpoint of CRM and author and preview the fetch based reports before they can be uploaded to CRM. Fetch report authoring extension setup 224 within business intelligence development tool 220 and CRM server setup 228 provide setup and configuration functionalities. According to some embodiments, a report wizard in CRM may enable authoring of simple fetch based reports based on a set of inputs from the user. The reports may be downloaded and then enhanced in business intelligence development tool 220. According to other embodiments, support may be provided for viewing fetch based reports from within a variety of client applications through add-in modules, for example using a calendaring/email application such as Outlook® by Microsoft Corp. of Redmond, Wash.

Figure 3:
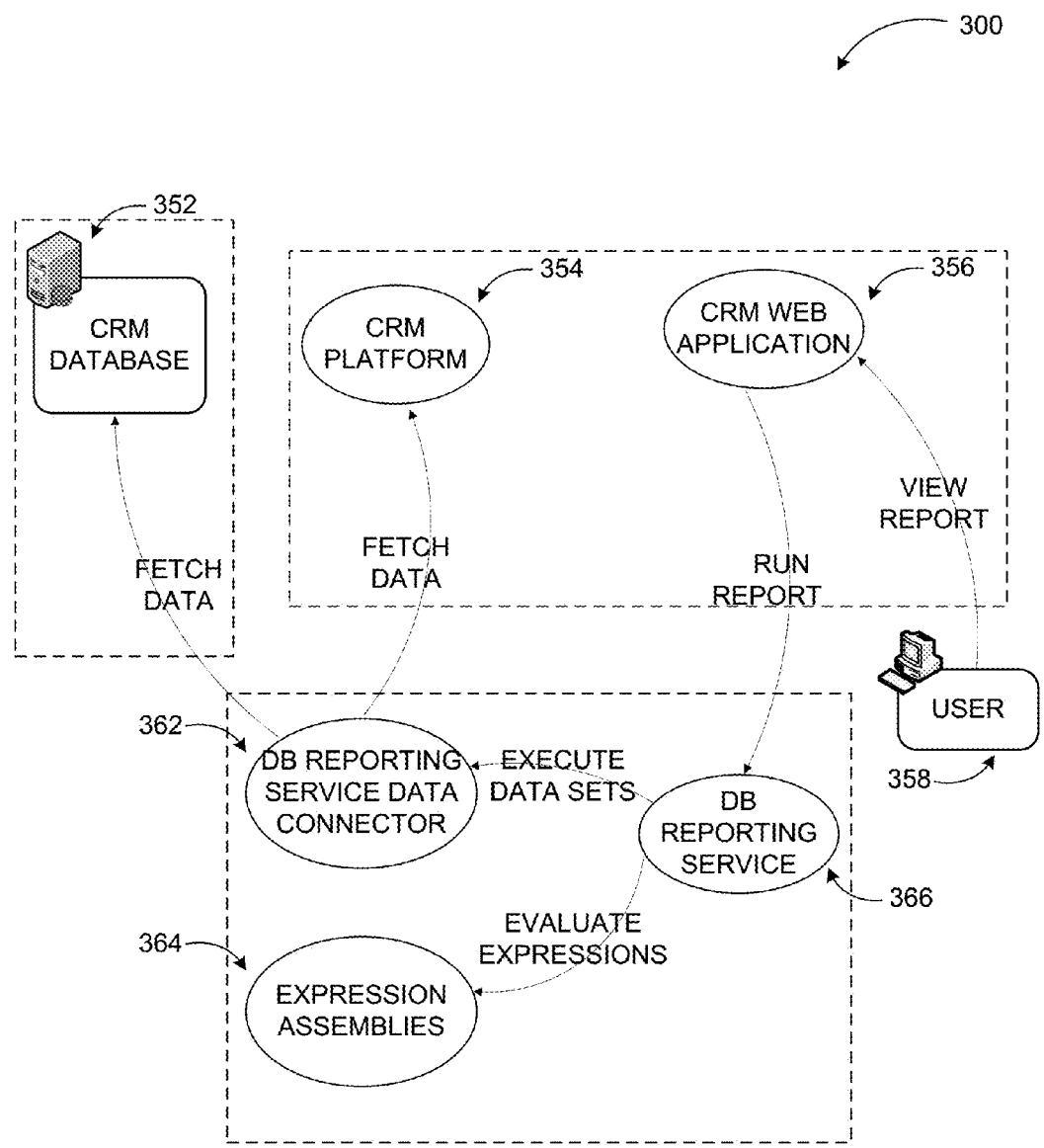
FIG. 3 illustrates interactions between major components of a CRM system according to some embodiments.

FIG. 3 illustrates interactions between major components of a CRM system according to some embodiments. The illustrative components in diagram 300 are grouped by their functionality by dashed lines.

In an example scenario, user 358 may submit a request to view a report to CRM web application 356 (hosted service) by also providing his/her credentials, password, or having a pre-installed cookie. CRM web application 356 may run the report by submitting the report name and CRM user context to DB reporting service 366 as a machine account. DB reporting service 366 may be sandboxed (i.e., separated from simultaneously executed programs for security) enabling secure implementation of reporting features by the hosted service similar to those in an on-premise CRM system.

DB reporting service 366 may execute data sets by providing parameters and CRM user context to DB reporting service data connector 362 through an in-process call. DB reporting service data connector 362 may fetch data from the CRM platform 354 by using a fetch XML (extensible markup language) file and CRM user context, and from CRM database 352 using a database query (e.g., SQL) and CRM user context. DB reporting service 366 may also evaluate expressions through an in-process call to expression assemblies 364.

With DB reporting services, users can create interactive, tabular, graphical, or free-form reports from relational, multidimensional, or XML-based data sources. They can also publish reports, schedule report processing, or access reports on-demand. Users are further enabled to create ad hoc reports based on predefined models, and to interactively explore data within the model. A user can select from a variety of viewing formats, export reports to other applications, and subscribe to published reports. The created reports may be viewed over a web-based connection or as part of an application. The reports may be defined in a structured language such as report definition language (RDL), an XML-based language.

Figure 4:
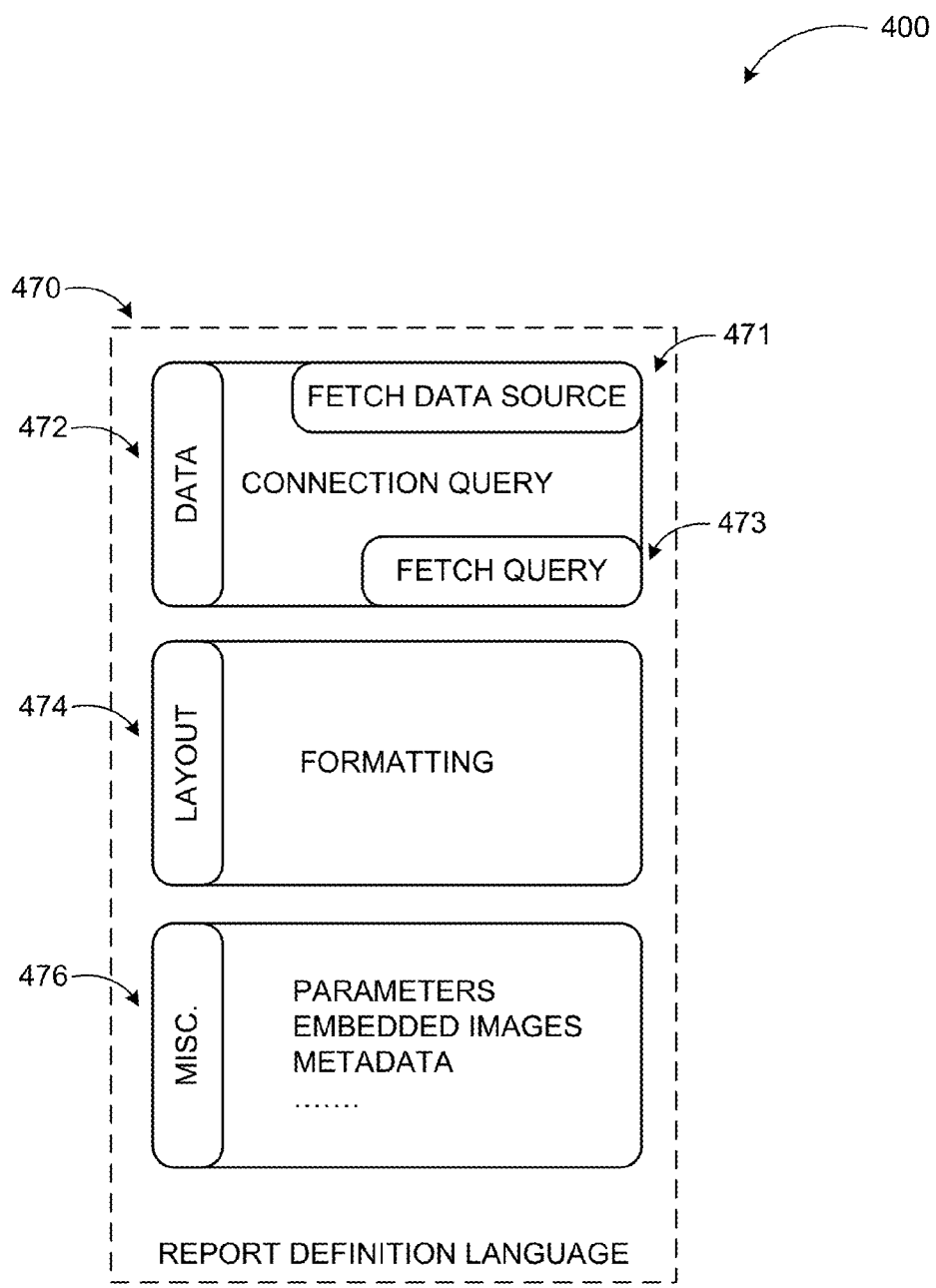
FIG. 4 is a diagram of example components of a report definition language for employing fetch queries according to embodiments.

FIG. 4 is a diagram of example components of a report definition language for employing fetch queries according to embodiments.

In a system according to embodiments, users may interact with the DB reporting service through a CRM application or directly and view, subscribe to, and manage reports as well as manage and maintain data sources and security settings. Reports may be delivered via e-mail or placed on a file system. Security may be role-based and can be assigned on an individual item, such as a report or data source, a folder of items, or site wide. Security roles and rights may be inherited.

Furthermore, reports may be embedded directly into web pages or various documents created by applications such as word processing documents, spreadsheets, presentations, etc. Reports may be processed through server processing, where the report is rendered by and obtained from the DB reporting service, or through local processing, where the RDL file itself may be rendered. Ad hoc reports may also be supported. For example, a designer may develop a report schema and deploy it on the reporting server, where a user can choose relevant fields/data and generate reports. Users can then download the reports locally.

As mentioned above, reports may be defined in RDL and designed using a business intelligence development tool, for example, as part of a design program such as Visual Studio® by Microsoft Corp. of Redmond, Wash. As shown in diagram 400, a report in RDL format 470 may include data 472 (connection query) with fetch data source 471 and fetch query 473. The report may further include layout 474 (formatting information) and miscellaneous items 476 (e.g., parameters, embedded images, metadata, etc.). Reports defined by RDL may be generated in a variety of formats including spreadsheet formats, word processing formats, standardized print formats, standardized image formats, XML, hypertext markup language (HTML), and similar ones.

The example systems and components in FIG. 1 through 4 have been described with specific components, processes, and interactions. Embodiments are not limited to systems according to these example configurations. A data reporting framework across on-premise and hosted CRM systems employing fetch query language may be implemented in configurations employing fewer or additional components and performing other tasks. Furthermore, specific protocols and/or interfaces may be implemented in a similar manner using the principles described herein.

Figure 5:
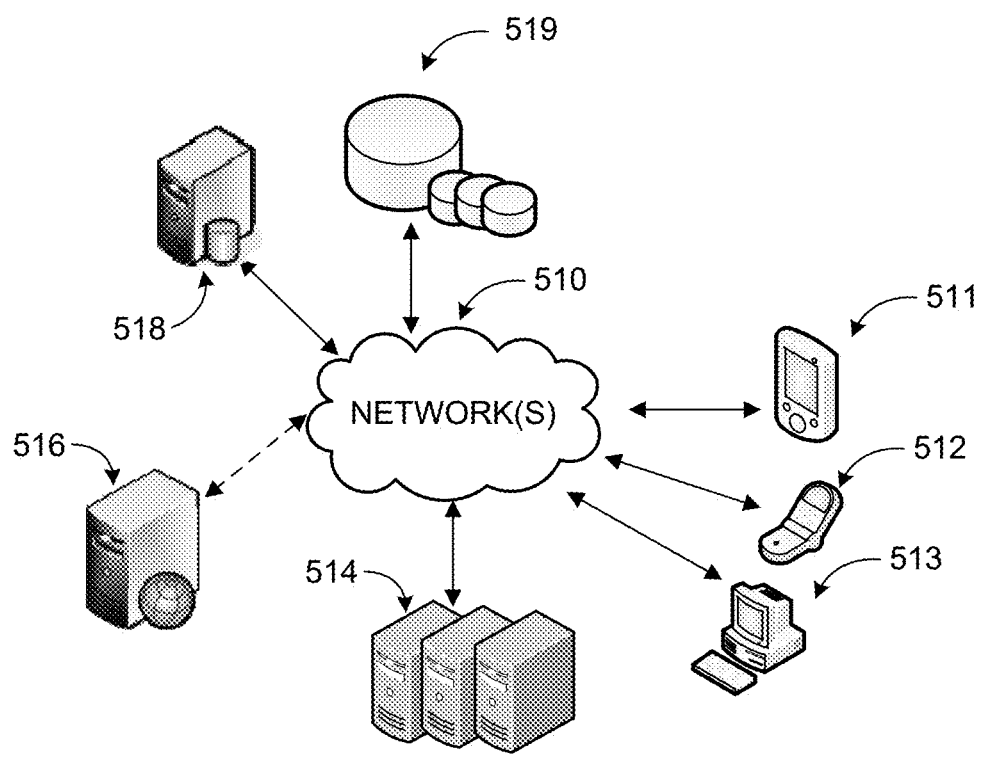
FIG. 5 is a networked environment, where a system according to embodiments may be implemented.

FIG. 5 is an example networked environment, where embodiments may be implemented. A data reporting framework that works across on-premise and hosted CRM platforms enabling definition and execution of secure custom reports may be implemented via software and hardware combinations in a networked environment. Components of such a framework may include a CRM service executed on one or more servers such as server 514, a database reporting service executed on server 516, and CRM data stored on one or more data stores such as data stores 519, which may be accessible directly or through database server 518. The business service platform may communicate with client applications on individual computing devices such as a handheld computing device 511, smart phone 512, and computer 513 ('client devices') through network(s) 510.

Client applications executed on any of the client devices 511-513 may facilitate interaction with the CRM service executed by servers 514, or on individual server 516. A business intelligence development tool may employ a fetch query language of the CRM platform along with reporting service tools and constructs to enable users to upload and execute custom fetch based reports with support for expressions, code, formatting, and drill through, as well as to build simple reports from within CRM and, if needed, enhance those report using reporting service tools and re-upload in CRM.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a platform providing a data reporting framework that works across on-premise and hosted CRM platforms enabling definition and execution of secure custom reports. Furthermore, the networked environments discussed in FIG. 5 are for illustration purposes only. Embodiments are not limited to the example applications, modules, or processes.

Figure 6:
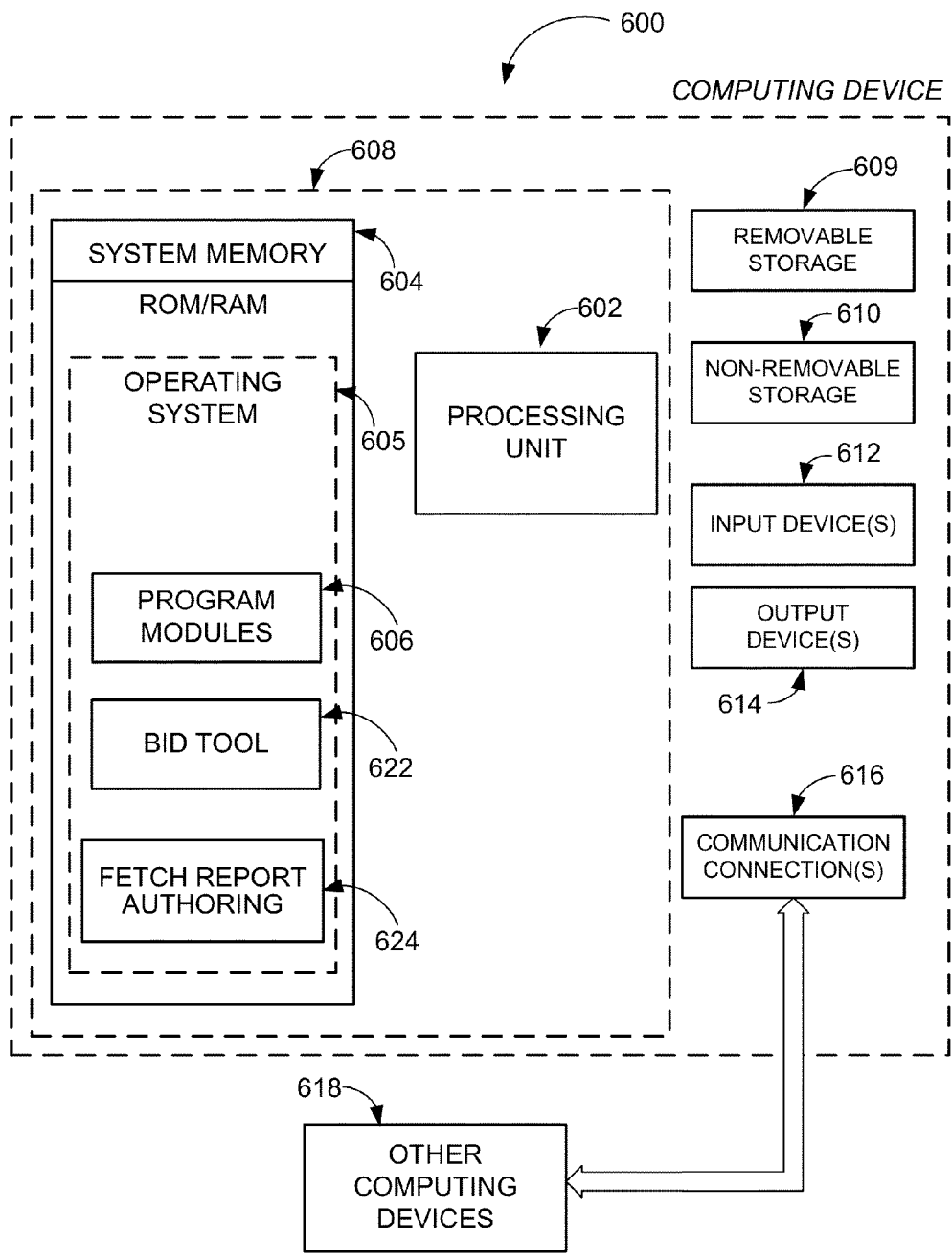
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be any computing device executing a CRM application according to embodiments and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash.

The system memory 604 may also include one or more software applications such as program modules 606, business intelligence development tool 622, and fetch report authoring module 624. Business intelligence tool 622 in conjunction with the fetch report authoring module 626 may connect to a public web service endpoint of the CRM service and enable authoring and previewing of fetch based reports before they can be uploaded to the CRM service. A report wizard within the CRM service may enable users to author simple fetch based reports based on a set of inputs from the user. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, web servers, and comparable devices. Communication connection(s) 616 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
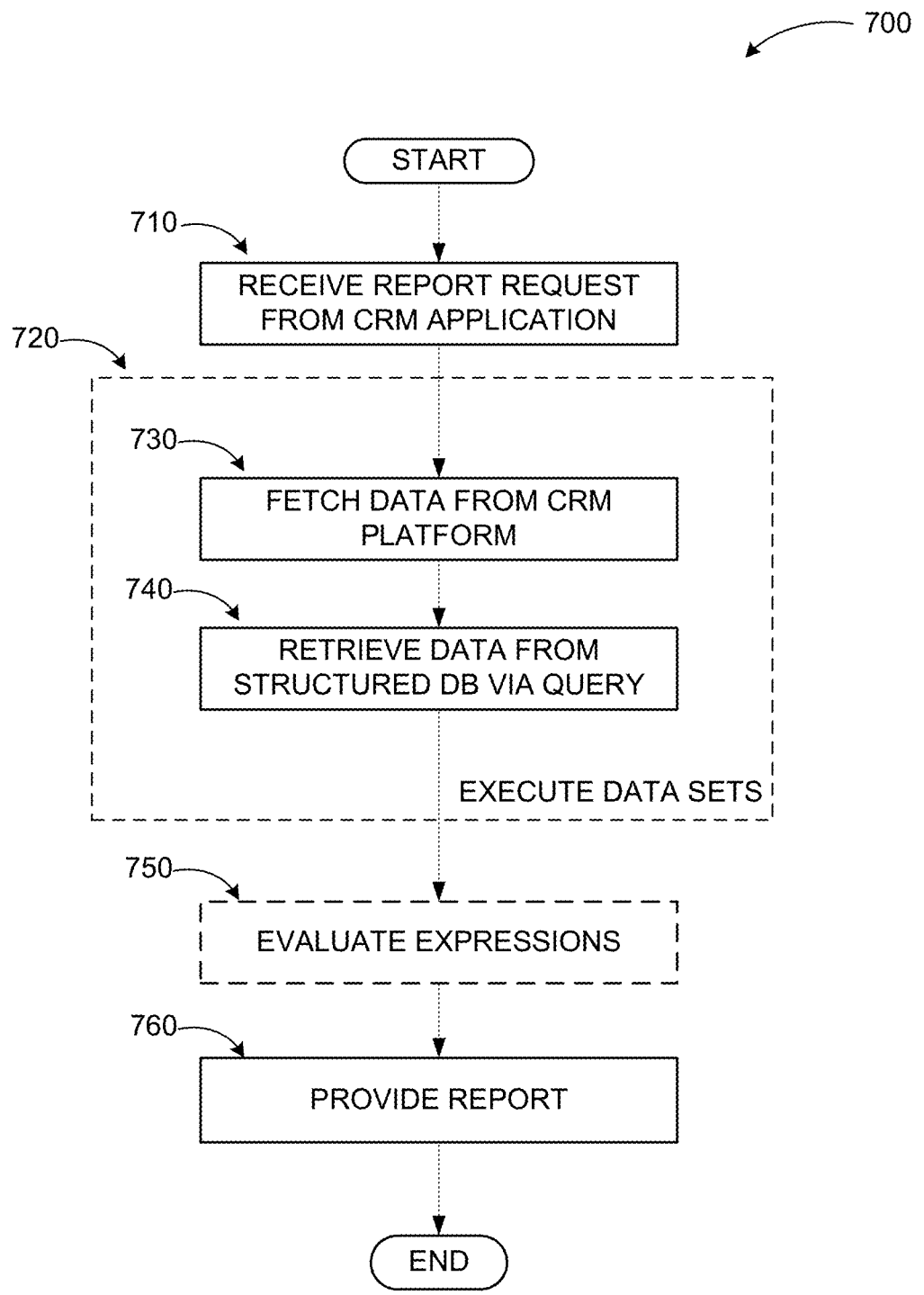
FIG. 7 illustrates a logic flow diagram for a process of data reporting in a CRM environment according to embodiments.

FIG. 7 illustrates a logic flow diagram for process 700 of data reporting in a CRM environment according to embodiments. Process 700 may be implemented on a server associated with a CRM system.

Process 700 begins with operation 710, where a report run request is received from a CRM web application in response to the application receiving a request from a user. The request may include user context and report name. Operation 710 may be followed by execution of data sets 720 in two separate operations. At operation 730, data may be fetched from the CRM platform using fetch query language (XML based format). Data stored at a structured database such as an SQL database may be retrieved through structured queries (e.g., SQL queries) at operation 740.

Execution of data sets 720 may be followed by evaluation of expressions 750 and transmittal of the report 760 to the requesting web application. The reporting service operations may be executed in a sandboxed manner at the hosted, multi-tenant CRM service such that security of data is assured.

The operations included in process 700 are for illustration purposes. A data reporting framework that works across on-premise and hosted CRM systems employing fetch query language may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for providing a data reporting framework in a hosted, multi-tenant Customer Relationship Management (CRM) system, comprising:
   receiving a report request with one or more of: a password, user credentials, or a pre-installed cookie associated with a user;
   executing data sets for the requested report at a reporting service of the CRM system in a sandboxed manner by employing fetch statements to query at least one database, wherein the reporting service executes the data sets by providing parameters and a CRM user context to a database reporting service data connector through an in-process call, and the database reporting service data connector fetches data from the CRM system employing a fetch extensible markup language file and the CRM user context and fetches data from the at least one database employing a database query and the CRM user context;
   providing the user with a report schema developed to include fields with associated data, and deployed on a database reporting service server such that the user is enabled to select one or more of the fields relevant to the user within the report schema to generate the requested report;
enabling, through a business intelligence development tool executed by an authoring server of the CRM system, an upload and execution of custom reports with support for at least one from a set of: expressions, code, formatting, and drill through;
enabling the user to author and preview fetch based reports before the reports are uploaded to a requesting web application through an authoring module of the business intelligence development tool that connects to a public web service endpoint of the CRM system; and
providing the requested report to the requesting web application.

2. The method of claim 1, further comprising:
enabling the user to define a custom report with multiple data sets employing fetch query language through the business intelligence development tool.

3. The method of claim 1, wherein the fetch statements are translated to structured query statements in a transparent manner to the requesting web application.

4. The method of claim 1, further comprising:
controlling usage of code elements and expressions through the sandboxing of the reporting service.

5. The method of claim 1, further comprising:
enabling the user to view fetch based reports through a non-CRM client application.

6. The method of claim 1, further comprising:
enabling the user to author fetch based reports by providing a set of inputs through a report wizard.

7. The method of claim 6, further comprising:
enabling the fetch based reports created through the report wizard to be downloaded and enhanced at a business intelligence development tool.

8. The method of claim 1, further comprising:
load balancing among available servers of the CRM system to effectively manage report viewing requests.

9. A hosted, multi-tenant Customer Relationship Management (CRM) system capable of supporting a fetch based data reporting framework to be executed on a computing device, the system comprising:
a CRM server executing:
a web application configured to receive report requests from a user and provide fetch based reports to the user;
an object model defining a collection of objects and classes through which the web application examines and manipulates portions of the CRM system; and
a CRM database reporting service object model configured to define objects specific to the fetch based data reporting framework;
a reporting service server administered via a web interface configured to:
execute a reporting service to:
receive a report request with a user context and report name from the web application;
execute data sets for the requested report by employing fetch statements to query at least one database, wherein the data sets are executed in a sandboxed manner by separating the executed data sets from simultaneously executed programs for security;
evaluate expressions of a custom requested report, wherein usage of the expressions is controlled in the sandboxed manner to enable secure implementation of reporting features by the multi-tenant CRM system similar to reporting features of an on-premise CRM system;
provide the requested report to the web application; and
manage one or more components associated with the reporting service including: a database service reporting server connector, a fetch data processing extension and database service reporting server configuration files; and
an authoring server configured to execute a business intelligence development tool that is adapted to:
in conjunction with a fetch report authoring module, connect to a public web service endpoint of the CRM server;
enable the user to define a custom report with multiple data sets employing fetch query language;
enable an upload and execution of custom reports with support for at least one from a set of: the expressions, code, formatting, and drill through; and
enable the user to author and preview fetch based reports before the reports are uploaded to the web application through the fetch report authoring module.

10. The system of claim 9, wherein report viewing requests are proxied to the reporting service server through the CRM server.

11. The system of claim 9, wherein a private web service endpoint of the CRM system is employed for enabling the reporting service server to communicate with a plurality of CRM servers in order to fetch data.

12. The system of claim 9, wherein the reporting service server is further configured to:
enable users to create, deploy, and manage reports for their organization, and provide programming features for extending and customizing reporting functionality.

13. The system of claim 9, wherein the at least one database is a Structured Query Language (SQL) database and fetch statements are translated to structured query statements in a transparent manner to the web application.

14. A method for providing a data reporting framework in a hosted, multi-tenant Customer Relationship Management (CRM) system, the method comprising:
enabling users to define a custom report with multiple data sets employing fetch query language via a web interface executed by a CRM server;
receiving a report request with a user context and report name from a web application at a reporting service executed by a database reporting service server;
executing data sets for the requested report by employing fetch statements to query CRM data stores and translating fetch statements into structured query language statements to query structured databases, wherein the execution of the data sets is controlled in a sandboxed manner by separating the executed data sets from simultaneously executed programs for security;
evaluating expressions of a customized requested report, wherein usage of the expressions is controlled in the sandboxed manner to enable secure implementation of reporting features by the multi-tenant CRM system similar to reporting features of an on-premise CRM system; else
providing the user with a report schema developed to include fields with associated data, and deployed on the database reporting service server such that the user is enabled to select one or more of the fields relevant to the user within the report schema to generate the requested report;

enabling the user, through a business intelligence development tool, an upload and execution of custom reports with support for at least one from a set of: the expressions, code, formatting, and drill through;

enabling the user to author and preview fetch based reports before they can be uploaded to the web application through an authoring module of the business intelligence development tool that connects to a public web service endpoint of the CRM system; and providing the requested report to the web application.

15. The method of claim 14, further comprising:

enabling the users to create at least one from a set of: interactive, tabular, graphical, and free-form reports from one of a relational, a multidimensional, and an XML-based data source; and enabling the users to at least one from a set of: publish the reports, schedule report processing, access the reports on-demand, select a viewing format, export a report to a non-CRM application, and subscribe to published reports.

16. The method of claim 14, wherein the report is processed through one of: server processing, where the report is rendered by and obtained from a reporting service, and local processing, where an XML based report file is rendered by a client application.

17. The method of claim 14, wherein the report is generated in an XML based language and includes at least one from a set of: a connection query, a fetch data source description, a fetch query, formatting information, parameters, embedded images, and metadata.

\* \* \* \* \*